(12) United States Patent
Thiebaud et al.

(10) Patent No.: US 9,113,113 B2
(45) Date of Patent: Aug. 18, 2015

(54) METHOD OF PROCESSING OF COMPRESSED IMAGE INTO A GAMUT MAPPED IMAGE USING SPATIAL FREQUENCY ANALYSIS

(75) Inventors: Sylvain Thiebaud, Noyal sur Vilaine (FR); Pascal Bourdon, Le Grand Fougeray (FR); Jürgen Stauder, Sur Ille (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1001 days.

(21) Appl. No.: 12/387,127

(22) Filed: Apr. 28, 2009

(65) Prior Publication Data

US 2009/0285478 A1 Nov. 19, 2009

(30) Foreign Application Priority Data

May 14, 2008 (EP) .................................... 08305169

(51) Int. Cl.
G06K 9/00 (2006.01)
H04N 1/60 (2006.01)
(52) U.S. Cl.
CPC ............... *H04N 1/6058* (2013.01); *H04N 1/60* (2013.01)
(58) Field of Classification Search
None
See application file for complete search history.

(56) References Cited

U.S. PATENT DOCUMENTS

| 5,450,216 | A | 9/1995 | Kasson |
| 6,151,136 | A | 11/2000 | Takemoto |
| 6,359,703 | B1 | 3/2002 | Yabe |
| 6,516,089 | B1 | 2/2003 | McCann et al. |
| 6,633,668 | B1 | 10/2003 | Newman |
| 6,961,477 | B2* | 11/2005 | Martinez-Uriegas et al. ................ 382/283 |
| 7,346,208 | B2* | 3/2008 | Staelin et al. ................ 382/157 |
| 2001/0011959 | A1* | 8/2001 | Hirano et al. .................... 341/65 |
| 2002/0076115 | A1* | 6/2002 | Leeder et al. ................ 382/250 |
| 2003/0012427 | A1 | 1/2003 | Martinez-Uriegas et al. |
| 2004/0130738 | A1 | 7/2004 | Yagishita |
| 2005/0083352 | A1 | 4/2005 | Higgins |
| 2005/0128355 | A1 | 6/2005 | Kang et al. |
| 2005/0128496 | A1 | 6/2005 | Bala |
| 2005/0185837 | A1 | 8/2005 | Takano et al. |
| 2006/0103861 | A1 | 5/2006 | Klassen et al. |
| 2006/0204057 | A1 | 9/2006 | Steinberg |

FOREIGN PATENT DOCUMENTS

| CA | 2296439 A1 | 1/1999 |
| CN | 1645904 A | 7/2005 |
| CN | 101076848 A | 11/2007 |
| EP | 0959618 A2 | 11/1999 |

(Continued)

OTHER PUBLICATIONS

Mullen; "The contrast sensitivity of human colour vision to red-green and blue-yellow chromatic gratings"; J. Physiology, Feb. 1985, 459 381-400.*

(Continued)

*Primary Examiner* — Chan Park
*Assistant Examiner* — Eueng-Nan Yeh
(74) *Attorney, Agent, or Firm* — Myers Wolin, LLC (57) ABSTRACT

The spatial frequency analysis contained in the compressed image is used not only for decompression of images but also for the selection of an appropriate gamut mapping algorithm. Computation resources are then saved because no specific spatial frequency analysis is required for the selection of an appropriate gamut mapping algorithm.

16 Claims, 7 Drawing Sheets

(56) References Cited

FOREIGN PATENT DOCUMENTS

| | | |
|---|---|---|
| EP | 1049324 | 11/2000 |
| EP | 1098511 | 5/2001 |
| JP | 06-276101 A | 9/1994 |
| JP | 10-294877 A | 11/1998 |
| JP | 2005-101712 A | 4/2005 |
| JP | 2006-157331 A | 6/2006 |

OTHER PUBLICATIONS

Peli; "Contrast sensitivity function and image discrimination"; J. Opt. Soc. Am. A; vol. 18. No. 2, Feb. 2001, 283-293.*

Search Report dated Aug. 22, 2008.

Gustav J. Braun et al., "Image Lightness Rescaling Using Sigmoidal Contrast Enhancement Functions", Munsell Color Science Laboratory, Chester F. Carlson Center for Imaging Science, Rochester Institute of Technology, One Lomb Memorial Drive, Rochester, New York 14623-5603, (published (1999) before this application Apr. 2009).

Garrett M. Johnson et al., "Darwinism of Color Image Difference Models", Munsell Color Science Laboratory, Center for Imaging Science, Rochester Institute of Technology, Rochester, NY, (published (2001) before this application Apr. 2009).

Alan Johnston, "Spatial scaling of central and peripheral contrast-sensitivity functions", Department of Human Sciences, Brunel University, Uxbridge, Middlesex, UK, J. Opt. Soc. Am. A, vol. 4, No. 8, Aug. 1987, pp. 1583-1593.

Hiroaki Kotera, et al, "Compact description of 3-D image gamut by r-image method", Journal of Electronic Imaging, vol. 12(4), Oct. 2003, pp. 660-668.

Chae-Soo Lee, et al., "Parametric Gamut Mapping Algorithms Using Variable Anchor Points", Journal of Imaging Science and Technology, vol. 44, No. 1, Jan./Feb. 2000, pp. 68-89.

Ethan D. Montag, et al., "Gamut Mapping: Evaluation of Chroma Clipping Techniques for Three Destination Gamuts", The Sixth Color Imaging Conference: Color Science, Systems, and Applications, pp. 57-61, (published (1998) before this application Apr. 2009).

Jan Morovic, et al., "A Multi-Resolution, Full-Colour Spatial Gamut Mapping Algorithm", Hewlett Packard Company, Barcelona Spain, Color & Imaging Institute, University of Derby, Derby, United Kingdom, Published Nov. 2003.

J. Anthony Movshon, et al., "Analysis of the development of spatial contrast sensitivity in monkey and human infants", J. Opt. Soc. Am. A, vol. 5, No. 12, Dec. 1988, pp. 2166-2172.

Kowaliski et al., "Vision et mesure de la couleur", 2nd Edition, 1990, Masson, Paris, Fig. 2, Diagram of Contrast sensitivity function (CSF) and Chromatic sensitivity function (CCSF). (Published before this application Apr. 2009).

* cited by examiner

METHOD OF PROCESSING OF COMPRESSED IMAGE INTO A GAMUT MAPPED IMAGE USING SPATIAL FREQUENCY ANALYSIS

This application claims the benefit, under 35 U.S.C. §119 of EP Patent Application 08305169.8, filed May 14, 2008.

TECHNICAL FIELD

The invention relates to the decompression of image data and to the color management of image data.

BACKGROUND ART

For the last fifteen years, image compression algorithms have been using "vision pyramid" models to reduce visual quality loss during quantization. A typical image compression flowchart is illustrated on FIG. 1: the image is first decomposed into coefficients showing the spatial frequency distribution of color values of pixels (e.g. using Discrete Cosine Transform or Wavelet Transform), with the aim of organizing information from a human vision perspective. Then, spatial frequency distribution coefficients are either smoothly or severely quantized, depending on the target compression ratio, with coarse information being advantaged over image details. Finally, binary coding is applied to reduce the size of quantized spatial frequency distribution coefficients. In the specific case of JPEG/MPEG image compression, the frequency transform step and the quantization step are applied locally, on 8×8 pixels block areas.

A color gamut defines the complete set of colors an imaging display device is able to reproduce, or an image capturing device is able to capture, or that is contained within an item of visual content such as an image. Because of hardware limitations, many color devices are unlikely to provide a good reproduction of colors of images which have been processed in order to be correctly reproduced on other displays, for example with wider color gamut. A common case would be the comparison between colors of images being rendered on a CRT monitor and the same images coming out of a low quality color printer.

In order to ensure the best reproduction quality of images on different color reproduction devices having different color gamuts, several techniques have been proposed throughout the years, as those using so-called "Gamut Mapping" of colors. Gamut Mapping of colors ensures that the colors of a source device are transformed to be located inside the gamut of a destination device. Such an operation can be performed using a series of criteria that will minimize the impact of the transformation that inherently introduces changes in the colorimetry of images. Several algorithms have been developed to map source colors into destination colors, such as lightness mapping or chroma mapping, which represents a first direction towards Human Visual System ("HVS") criteria, since the human eyes do process visual data through lightness and chroma considerations.

The CIE standardized a visual perceptually-uniform color space denominated CIE 1976 (L* u* v), also known as CIELUV, accounts for the psychophysics of human vision by constructing a three-dimensional color space that is substantially perceptually uniform. The coordinates of a color in CIELUV requires a color in well known CIE1931 XYZ to be normalized with respect to the XYZ coordinates of a "white point", as defined in the art. One axis of CIELUV color space is denominated the CIE 1976 Lightness, noted L*, and is defined using a cube-root function in XYZ with a straight-line segment at the origin. The position of a color along the L* axis contains only information derived from its luminance as related to the reference white point. The other two axes of CIELUV are derived from the chromaticity of the image point related to the chromaticity of the reference white point. Multiplying the difference between the chromaticities of the image point and the reference white point by a value proportional to L* mimics the psycho-physical effect that causes darker colors to appear less chromatic, thus leading to perceptual uniformity in the CIELUV space. The cylindrical representation of the CIELUV color space is also useful. The L* axis remains unchanged while the plane defined by the two Cartesian chrominance axes is expressed in terms of a phase angle corresponding to the so-called hue H and a radius associated with the so-called chroma C. In 1976, the CIE also standardized another visual perceptually-uniform color space with characteristics similar to the CIELUV color space, denominated the CIE 1976 (L* a* b), or CIELAB, which also can be expressed in terms of a Cartesian coordinate system (L by a by b) or a cylindrical coordinate system (L by hue H by chroma C). In a perceptually-uniform color space, the three Cartesian bases are denominated luminance (L) and chrominance (C1, C2). The Cartesian chrominance plane may be also described in terms of two polar chrominance bases denominated chroma (C) and hue angle (H). Thus, chroma (C) is defined as the square root of the sum of the squares of the two chrominance values (C1 and C2) and hue angle (H) is defined as the arctangent of the ratio of the two chrominance dimensions (C2/C1).

Many color Gamut Mapping techniques tend to focus on 2D or 3D geometric solutions. Such techniques consist in reshaping/mapping parts of a source color gamut with either hard or soft color compression/clipping or extension algorithms so these reshaped/mapped parts can fit in a destination color gamut. Some algorithms use criteria in order to limit the visual impact of the mapping. Known criteria are for instance hue conservation, spatial homogeneity of mapping in color space and contrast preservation.

A typical 2D geometric mapping method would perform clipping in the CIEL*a*b* color space, more precisely in a L*C* subspace, where L is the lightness of a color and where C* represents the chroma of a color:

$$C^* = \sqrt{a^{*2} + b^{*2}}$$

Figure 2:
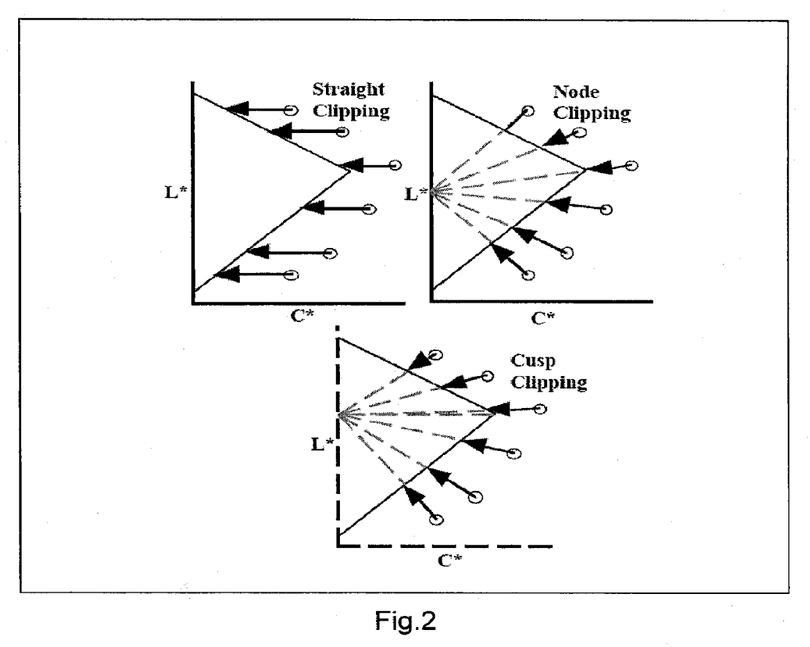
FIG. 2 illustrates different color gamut mapping algorithms using color clipping method with an anchor point.

(a high C* value represents a high saturation level). Examples of hard and soft color clipping methods can be observed on FIG. 2, taken from the article entitled "Gamut mapping: Evaluation of chroma clipping techniques for three destination gamuts", authored by Montag, E. D. and Fairchild, M. D., published in IS&T/SID Sixth Color Imaging Conference, Scottsdale, 57-61, 1998. In "straight clipping", all out-of-gamut colors are mapped into the destination gamut in a direct C*-shift operation with no change of the lightness L*. Softer color clipping methods may use a fixed anchor point ("node clipping") to ensure a better preservation of saturation levels. More details about such clipping methods will be given below.

Some color gamut mapping algorithms have less visual impact than others depending on the criterion to be minimized. Generally, the criterion to be minimized is global and all pixels of the image to be color mapped are processed usually with the same algorithm. Such methods do not rely on local variations in the image, and are likely to generate inappropriate contrasts in certain cases (e.g. increasing quantization or acquisition noise in homogeneous areas).

On the opposite, different parts of an image can be color mapped differently depending on their local characteristics. The color gamut mapping methods using such information are referred to as "content-dependent", notably "spatial frequency-dependent". Human vision studies teach that a human observer tends to hierarchically process visual data in a scene, from coarse to fine elements. This behavior is generally modeled after a Gaussian pyramid, or any kind of signal processing tool that can distinguish and organize the content of an image from low to high spatial frequencies of distribution of color values within said image.

The document U.S. Pat. No. 6,961,477 discloses applying different color gamut mapping algorithms to different regions of an image according to the spatial frequency content of color values within this image. According to this document, the regions of the original image are spatially segregated into "busy" regions and "smooth" region and each region is associated with one or plural color gamut mapping algorithms. An important issue with this solution is that the color mapping of adjacent pixels having the same color value may be very different at the boundary of two regions, then introducing unacceptable artifacts. EP1098511, US2003/012427 and U.S. Pat. No. 6,516,089 illustrate other examples of color gamut mapping algorithms that depend on spatial frequency content of the images to map. In U.S. Pat. No. 5,450,216, such a spatial filtering exploits the differing spatial frequency regions of insensitive human visual response to both lightness and chrominance changes, according to the so-called Contrast Sensitivity Function (CSF), which concerns the lightness and is achromatic, and according to Chromatic Contrast Sensitivity Functions (CCSF), which concerns the chrominance according first to a red-green chroma, and secondly to a blue-yellow chroma, then allowing the mapping of colors in a manner that minimizes the human visual response both to the luminance and to the chrominance changes. For instance, as stated at column 8, lines 51-57, of this document, source colors are mapped in the direction of luminance only at low spatial frequencies to which human eyes are relatively insensitive to luminance variations but more sensitive to chrominance variations, then allowing a minimum change of chrominance.

Figure 3:
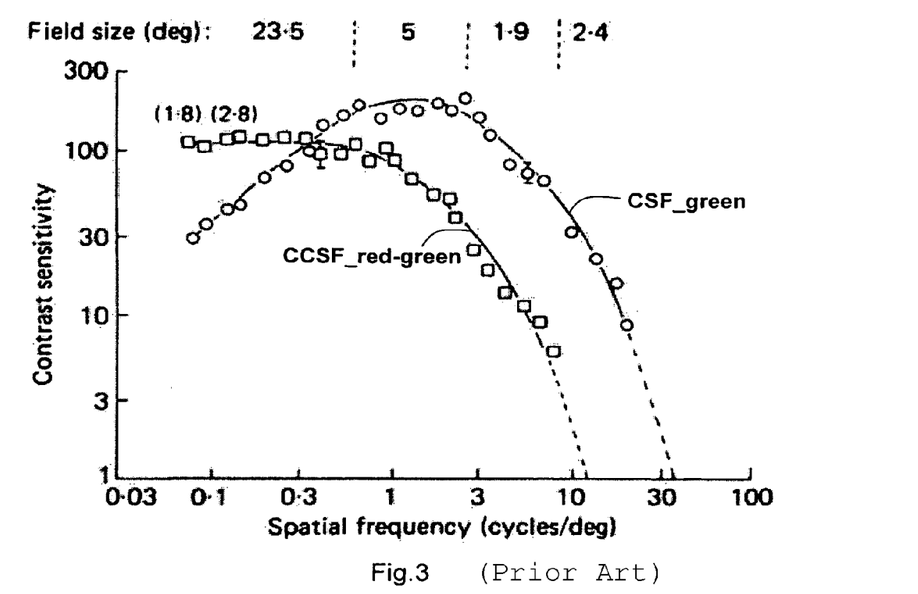
FIG. 3 shows the Contrast Sensitivity Function (CSF) and the red-green Chromatic Contrast Sensitivity Functions (CCSF)
Figure 4:
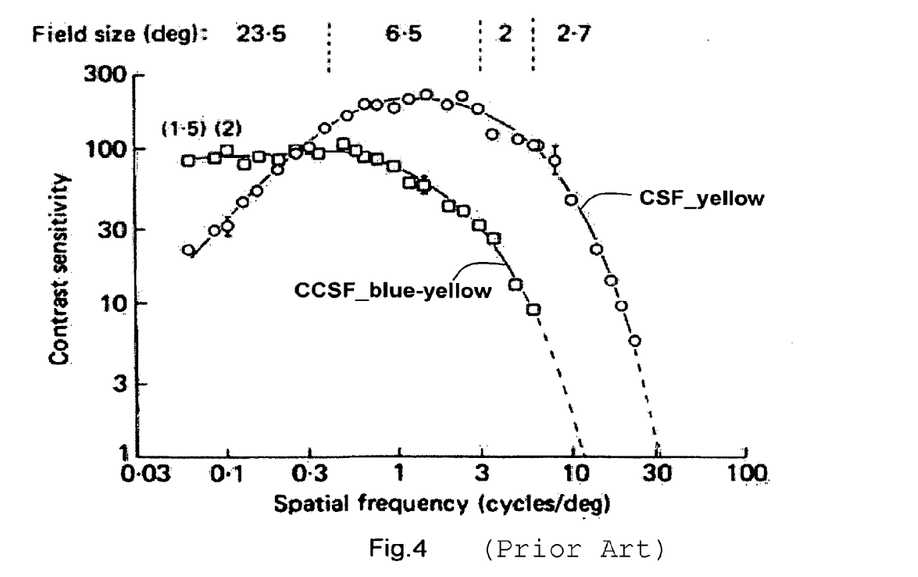
FIG. 4 shows the Contrast Sensitivity Function (CSF) and the blue-yellow Chromatic Contrast Sensitivity Functions (CCSF)

The above-mentioned CSF and CCSF characterizing the Human Visual System (HVS) are very well known in the art. FIGS. 3 and 4 show example of such functions as given in the article entitles "The contrast sensitivity of human color vision to red-green and blue-yellow chromatic gratings", authored by Kathy T. Mullen, published in the Journal of Physiology—London, Vol. 359, pages 381-400, 1985. On FIG. 3, the ○ (circle) symbol designates the CSF based on measurements performed at 526 nm with a green monochromatic grating and the □ (square) symbol designates the red-green CCSF based on measurements performed at 526, 602 nm with a red-green grating. On FIG. 4, the ○ (circle) symbol designates the CSF based on measurements performed at 577 nm with a yellow monochromatic grating and the □ (square) symbol designates the blue-yellow CCSF based on measurements performed at 577, 470 nm with a blue-yellow grating. Other sources may be also considered as the article entitled "Spatial scaling of central and peripheral contrast-sensitivity functions", authored by Alan Johnston, published in the Journal of the Optical Society of America A, Vol. 4, page 1583, August 1987, variations of the CSF and CCSF are given according to different parts of the retina of human eyes.

Figure 5:
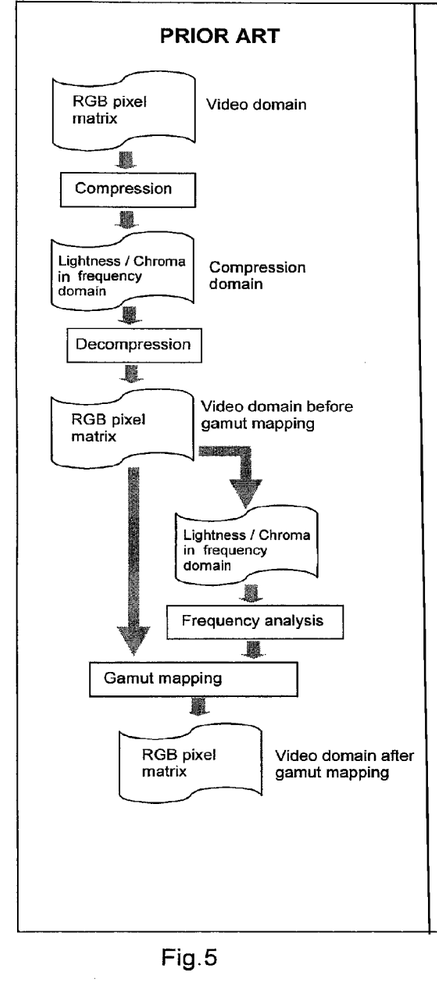
FIG. 5, already mentioned, discloses an entire chain of compression, decompression and color gamut mapping of images, where decompression and color gamut mapping use both spatial frequency analysis that are performed separately according to the prior art.

FIG. 5 shows a classical diagram of a method of processing a compressed image into a decompressed color gamut mapped image: decompression and color gamut mapping of images use both spatial frequency analysis but are quite separate operations.

SUMMARY OF INVENTION

An object of the invention is to improve such a method in view of saving computation resources.

For this purpose, the subject of the invention is a method of processing a compressed image into a color gamut mapped decompressed image, comprising the steps of:

entropy decoding the said compressed image into a plurality of adjacent compression block areas, dequantizing each compressed block area so as to provide a spatial frequency distribution of color values of pixels of said image within each compression block area, inverse-transforming the spatial frequency distribution of each block area into color values for each pixel of said block area, for each block area, selecting one of a plurality of color gamut mapping algorithms according to the spatial frequency distribution of color values within said block area, gamut mapping color values of each block area of said image using the color gamut mapping algorithm selected for said block area, so as to provide said color gamut mapped decompressed image.

The use of frequency transforms to organize image data shows an interesting relationship between image compression and content-dependent gamut mapping. As a matter of fact, using a common transform for both decompression and color gamut mapping advantageously save significant computation resources in a decoder. Moreover, as in many cases image data are converted into lightness-chrominance color spaces (typically YUV) before compression, color gamut mapping can also take advantage of such a conversion.

According to the invention, the spatial frequency analysis contained in the compressed image is used not only for decompression of images but also for the selection of an appropriate color gamut mapping algorithm. Computation resources are then saved because no specific spatial frequency analysis is required for the selection of an appropriate color gamut mapping algorithm.

Preferably, if the color values of each pixel are represented by at least a lightness or luma value and a chroma value, then, in said selecting step:

a color gamut mapping algorithm minimizing the variation of chroma values is associated with all block areas in which both lightness values and chroma values are distributed mainly in a low spatial frequency range below 0.4 cycle per degree, a color gamut mapping algorithm minimizing the variation of lightness or luma values is associated with all block areas in which both lightness or luma values and chroma values are distributed mainly in a high spatial frequency range above 0.4 cycle per degree.

In color gamut mapping, lightness-chroma conversion is usually performed using the CIELab colorspace, but using the more compression-compliant so-called YUV color space is very advantageous here, as it fit well with compressed JPEG/MPEG image data streams. The YUV color space corresponds to the YCbCr color space, which was developed as part of the ITU-R BT 601 standard.

Preferably, if the color values of each pixel are represented by at least a lightness or luma value and a chroma value, if, within each block area, a spatial bandwidth of the spatial frequency distribution of lightness or luma values within said block area is defined and a spatial bandwidth of the spatial frequency distribution of chroma values within said block area is defined, said selecting step is performed for said block area according to the difference between the value of the contrast sensitivity function (CSF) for said lightness or luma spatial bandwidth within said block area and the value of the chromatic contrast sensitivity function (CCSF) for said chroma spatial bandwidth within the same block area.

Preferably, each compression block area comprises 8×8 pixels.

Preferably, the compressed image is compliant with JPEG or MPEG compression standard.

The method of processing is also applicable to series of images, as video sequences.

BRIEF DESCRIPTION OF DRAWINGS

The invention will be more clearly understood on reading the description which follows, given by way of non-limiting example and with reference to the appended figures in which:

FIG. 7 illustrates the transformation between a 2D image space and a 2D spatial frequency domain that is used for compression of images, the reverse transformation being used for decompression of compressed images;

DESCRIPTION OF EMBODIMENTS

Although the illustrative embodiment is described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The present description illustrates the principles of the invention. It will thus be appreciated that those skilled in the art will be able to devise various arrangements that, although not explicitly described or shown herein, embody the present principles and are included within its spirit and scope. It will be appreciated by those skilled in the art that the block diagrams and flow charts presented herein represent conceptual views of illustrative circuitry embodying the present principles. The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. The appropriate software may be implemented as an application program tangibly embodied on a program storage unit.

Figure 1:
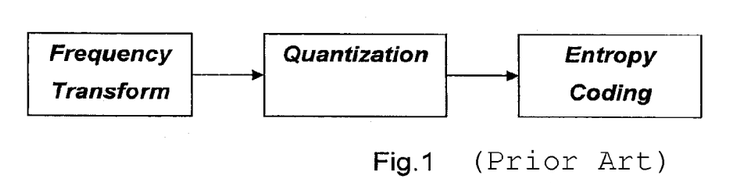
FIG. 1 illustrates a classical scheme of image compression

The method according to the invention is adapted to process images that are compressed as illustrated on FIG. 1; already mentioned.

Figure 7:
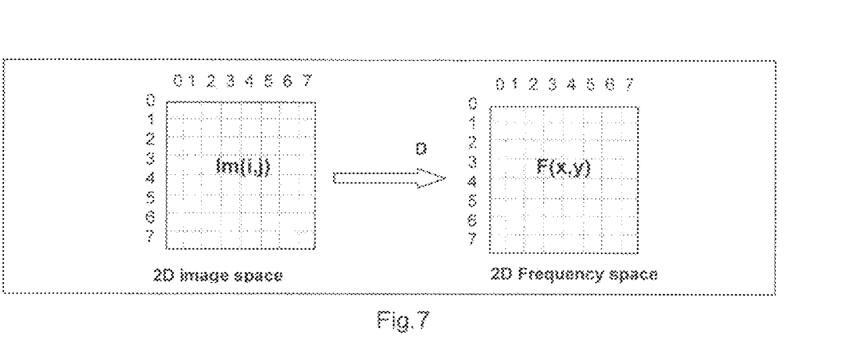
FIG. 7 illustrates the transformation of a block area of pixels of an image into a matrix of coefficients representing the spatial frequency distribution of colors within this block area.

The image to compress is divided into adjacent block areas and decomposed into coefficients showing the spatial frequency distribution of color values attached to the pixels of this image; a spatial part of the image around each pixel have to be remapped from the 2D image space to a 2D frequency space. A very well known way to accomplish this operation is to process a Discrete Cosines Transform (DCT) of the neighborhood of each pixel within each block area of pixels (DCT is notably used for Jpeg and Mpeg compression). The DCT transforms a matrix of color values to a matrix of coefficients representing the spatial frequency decomposition of the image. FIG. 7 illustrates an example of DCT process for a block area of 8×8 pixels of an image to compress. In the spatial frequencies space, the coefficients in the x direction represent the vertical frequencies of the image and the coefficients in the y direction represent the horizontal frequencies.

The following well-known expression is used to perform this DCT transformation, where N represents the size of the matrix:

$$F_{(x,y)} = k_{(x,y)} \sum_{n1=0}^{N-1} \sum_{n2=0}^{N-1} \text{Im}(i,j) \cos\left[\frac{\pi}{N}\left(n1+\frac{1}{2}\right)x\right]\cos\left[\frac{\pi}{N}\left(n2+\frac{1}{2}\right)y\right]$$

Figure 8:
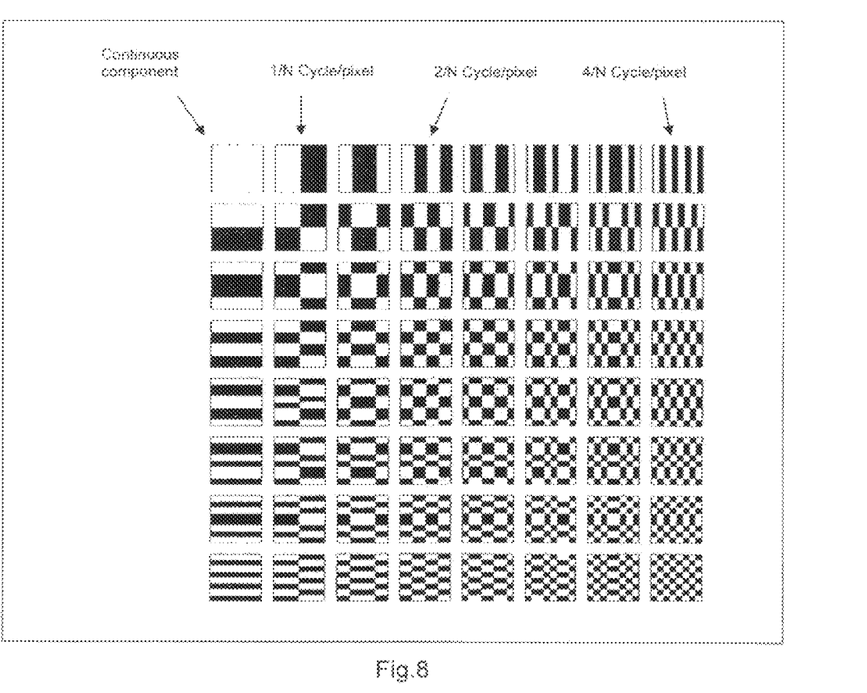
FIG. 8 represents the contribution of the spatial frequencies in two directions, horizontal and vertical, for a block area of 8×8 pixels of an image.

The N×N coefficient matrix obtained by this transformation represents the contribution of the spatial frequencies represented in FIG. 8 for N=8.

The DCT transform is an example of spatial to frequency transformation but other techniques of analysis in 2D frequency space can be applied such as Fourier transform, wavelets, other sub-bands defined by a filter bank, or others.

After quantization, a usual entropy coding is applied to reduce the size of quantized spatial frequency distribution coefficients such as to obtain the compressed image.

An embodiment of the method of processing this compressed image into at least one gamut mapped image according to the invention will now be illustrated in reference to FIGS. 6, 9-12.

A plurality of color gamut mapping algorithms and a selection rule for a gamut mapping algorithm according to a spatial frequency distribution of color values within any given block area should be preliminarily defined.

The plurality of color gamut mapping algorithms that is proposed here is based on color clipping methods. As already explained, color clipping methods map colors along mapping trajectories that are anchored to an anchor point, in the mapping color space. These color mapping trajectories are generally straight lines. The anchor points generally belong to the so-called achromatic axis or L* axis (or "grey line") of the color space. These anchor points can be chosen according to the shape of the source and destination gamuts such as described, for instance, by Montag and Fairchild in their paper entitled "Gamut mapping: Evaluation of chroma clipping techniques for three destination gamuts", published in 1998 at the IS&T/SID Sixth Color Imaging Conference in Scottsdale. The way how the color is moved along such color mapping trajectories can be various. Simple mapping algorithms clip all colors that are outside the target color gamut onto the target color gamut surface along the color mapping trajectories. More complex color mapping algorithms compress linearly all colors along the color mapping trajectories by linear scaling such that they keep on the same mapping trajectories but are all inside the destination color gamuts. Still more complex, non-linear parametric functions apply specific, sometimes piece-wise defined scaling operations to the colors to move them along the defined lines inside the target color gamut. For example, Braun and Fairchild suggest in their publication entitled "Image Lightness Rescaling Using Sigmoidal Contrast Enhancement Functions" published in 1999 in the Proceedings of SPIE Electronic Imaging Conference (Eli99) a non-linear, S-shaped function. When mapping colors from a source gamut into a destination gamut, the above cited papers use straight lines as color mapping trajectories, variable anchor points and mapping functions that define how far a color on a mapping straight line needs to be moved. The mapping trajectories, the anchor points and the mapping functions can be fixed or adapted to the source and target gamut boundaries in a given mapping color space.

Figure 6:
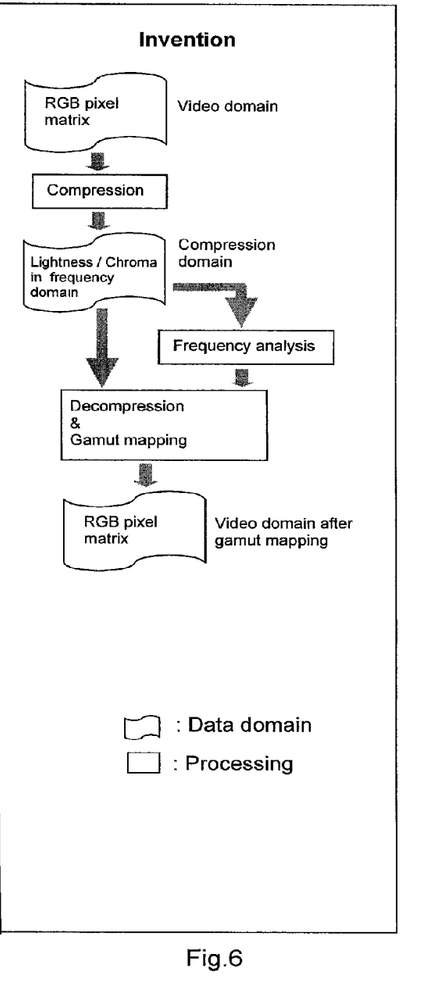
FIG. 6 discloses an entire chain of compression, decompression and color gamut mapping of images, where decompression and gamut mapping use the same spatial frequency analysis according to the invention.
Figure 9:
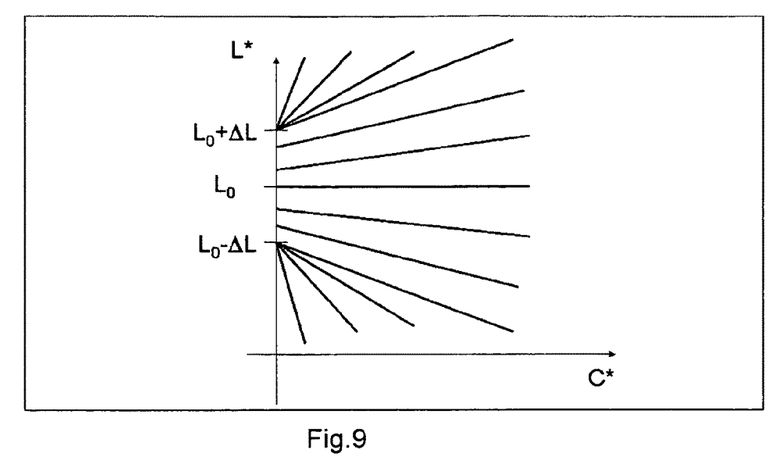
FIG. 9 represents one of the plurality of color gamut mapping algorithms that is used for each block area in the fifth step of the main embodiment of the invention.

In the color gamut mapping algorithms that are proposed here in reference to FIG. 6, the mapping color subspace L*C* is divided into three regions, a first region of minimum lightness, a second region of maximum lightness and a third central region of intermediate lightness; in the first region, source colors are mapped according to straight lines that are all anchored to a same first fixed anchor point positioned at $L_{min}$ on the L* axis; in the second region, source colors are mapped according to straight lines that are all anchored to a same second fixed anchor point positioned at $L_{max}$ on the L* axis; and in the third region, source colors will be mapped according to straight lines that are anchored to different and variable anchor points that are located between $L_{min}$ and $L_{max}$ on the L* axis. In FIG. 9, the range of variation of the position of the anchor point is $\Delta L=(L_{max}-L_{min})/2$ and the center of this range corresponds to $L_0=L_{min}+\Delta L$. The article entitled "Parametric gamut mapping algorithms using variable anchor points", published by Chae-Soo LEE, Chae-Hee LEE and Yeong-Ho HA, in the Journal of Imaging Science and Technology, volume 44, number 1, page 68-89 (January-February 2000) illustrates such a mapping method.

The selection rule of the color gamut mapping algorithm will use the CSF and CCSF. More details will now be given on these Sensitivity Functions in reference to FIGS. 3 and 4. The CSF and CCSF are represented in cycle per degree (cpd). It can be seen that the red-green and the blue-yellow chromatic contrast sensitivity functions (CCSF) have low pass characteristics and that the contrast sensitivity function (CSF) has more a pass-band characteristic. For the spatial frequencies lower than about 0.4 cpd, the CCSF is higher than the CSF but become lower for the frequencies higher than about 0.4 cpd. We will see below that the some algebraic models of the CSF and CCSF functions have been developed. This is these characteristics of the HVS we propose to consider in this embodiment of the invention to optimize the selection of a color gamut mapping method in a way to preserve as much as possible the local contrast of the image in a continuous way. The concept of local contrast should not be confused with the contrast of a displaying screen. Even if the blacker pixels on a screen are very black and the whiter pixels are very white indicating a good global contrast, an image could seam poor due to a low level of local contrast. Preserving the local contrast of an image is very important because a good local contrast gives what the photographers call the "pop" of an image.

The main grounds of the selection rule of the color gamut mapping algorithm is adapted to preserve as much as possible the local contrast of the image to map: it allows determining whether lightness preservation should be a priority over chroma preservation or vice-versa. By analyzing the spatial frequencies of distribution of color values around each pixel of an image to map, i.e. locally, we can determine if some high frequencies are present or not and set a value of $F_{max}$. This spatial frequency is preferably expressed in cycle per degree, considering the spatial frequencies of the image and also the viewing conditions as explained below. Then the difference between the CSF and the CCSF for this frequency $F_{max}$ is computed, and, from this difference, a range $\Delta L$ of variation of the position of the anchor point is calculated as explained below. In the homogenous parts of the image to map where the spatial frequency decomposition indicates very low frequencies for both lightness and chroma, the CCSF is higher than the CSF. In this case the HVS is more sensible to the chroma contrast than to the lightness contrast. The value of $\Delta L$ is then 0, meaning the anchor point is fixed and that a Node color Clipping algorithm (see FIG. 2) is selected as the most appropriate to preserve the local contrast by minimizing the chroma transformation. On the opposite, in much textured parts of the image to map which are composed of very high spatial frequencies for both lightness and chroma, the CSF is higher than the CCSF indicating that the HVS is more sensible to the lightness contrast. For this case, the value of $\Delta L$ is $\Delta L=L_{max}-L_0$, meaning that the position of the anchor point is variable on the L* axis and can be selected at a lightness corresponding the lightness of the color to map, meaning that a Straight Clipping algorithm (see FIG. 2) is then selected as the best algorithm to conserve the lightness local contrast. $L_0$ may also be derived from the shape of a color gamut. For example, $L_0$ is chosen as the luminance where the gamut has its largest chroma. A reasonable value for $L_0$ is 50.

These two cases above correspond to the extreme values of the CSF and CCSF, respectively for the very low and very high spatial frequencies. The selection rule that is proposed in this embodiment sets the value of $\Delta L$ in a continuous way between these two opposite cases. It means that the selection rule is adapted to manage the low and high frequencies to preserve the local contrast but also all the frequencies between these opposite cases by a continuous process. Advantageously, all values of the spatial frequencies are managed according to the HVS, without discontinuous steps in the treatment, and without boundaries that introduce artifacts.

It means that a continuous variation of ΔL from ΔL=$L_{max}$–$L_0$ to ΔL=0 allows to continuously pass from the Straight Clipping method to the Node Clipping method by using the variable anchor point concept.

The detailed computation of the range ΔL of variation of the position of the anchor point will be now detailed. In order to have both luminance and chrominance spatial frequencies influence contrast preservation term ΔL=0, it is proposed to define this term as a function ΔL(.) having the luma spatial bandwidth $F_{DCTLum\_max}$ and the chroma spatial bandwidth $F_{DCTChrom\_max}$ as input parameters that will be now defined.

In the case of a Discrete Cosine Transform F(x,y) of the image Im(i,j), generally speaking, a spatial bandwidth $W_{max}$ can be defined as the spatial frequency value for which the image signal has reached 95% (or a lower percentage) of its energy as follows:

$$\frac{\sum_{x=0}^{W_{max}} \sum_{y=0}^{W_{max}} \|F(x, y)\|}{\sum_{x=0}^{N-1} \sum_{y=0}^{N-1} \|F(x, y)\|} = 0.95.$$

ts corresponding value in cycle per degree (cpd) is defined as $$F_{max} = \frac{W_{max}}{\alpha},$$

where α is the angle of view of a pixel of the image in degree, provides information about a "locally representative" spatial frequency. Similarly, the values of a luma spatial bandwidth $W_{DCTLum\_max}$ and of a chroma spatial bandwidth $W_{DCTChrom\_max}$ can be defined in reference respectively to the CSF and to the CCSF. $F_{DCTLum\_max}$ and $F_{DCTChrom\_max}$ are similarly inferred from the values of $W_{DCTLum\_max}$ and $W_{DCTChrom\_max}$ using the value α of the angle of view.

Contrast Sensitivity Function and Chromatic Contrast Sensitivity Functions may be expressed in function of the frequency F by using the algebraic formula given by J. A. Movshon and L. Kiorpes in the article entitled "Analysis of the development of spatial contrast sensitivity in monkey and human infants", published in the Journal of the Optical Society of America, A 5, pages 2166-2172 (1988) and by G. M. Johnson and M. D. Fairchild, in the article entitled "Darwinism of Color Image Difference Models", published in IS&T/SID 9th Color Imaging Conference, Scottsdale, 24-30 (2001):

$$CSF(F) = a \cdot F^c \cdot e^{-bF}$$

$$CCSF(F) = a_1 \cdot F^{c_1} \cdot e^{-b_1 F} + a_2 \cdot F^{c_2} \cdot e^{-b_2 F}$$

where the parameters a, b, c, $a_1$, $b_1$, $c_1$, $a_2$, $b_2$, $c_2$ are defined to fit human vision, e.g. in the already quoted Johnson & Fairchild's article and as copied in following tables 1 and 2.

TABLE 1

| Parameter | Value |
|---|---|
| a | 75 |
| b | 0.2 |
| c | 0.8 |

TABLE 2

| Parameter | Red-Green | Blue-Yellow |
|---|---|---|
| $a_1$ | 109.14130 | 7.032845 |
| $b_1$ | 0.00038 | 0.000004 |
| $c_1$ | 3.42436 | 4.258205 |
| $a_2$ | 93.59711 | 40.690950 |
| $b_2$ | 0.00367 | 0.103909 |
| $c_2$ | 2.16771 | 1.648658 |

Here, the two CCSF functions are merged into an only-one function $$CCSF_{chroma}(F) = \sqrt{CCSF_{red-green}(F)^2 + CCSF_{yellow-blue}(F)^2},$$

whereas previous description (see FIGS. 3 & 4) referred to two different functions, i.e. a red-green $CCSF_{red-green}(F)$ and a yellow-blue $CCSF_{yellow-blue}(F)$. Such a merging of the two CCSF is possible because both red-green and blue-yellow CCSF appear to have about the same characteristics, notably a similar cutoff frequency (being lower than the luma cutoff frequency), and because we are principally interested in a luma-chroma decorrelation. The two CCSF are merged in a single CCSF, using a similar 2-to-1 conversion scheme than the Euclidian distance $$C^* = \sqrt{a^{*2} + b^{*2}}$$

used in gamut mapping algorithms.

Figure 10:
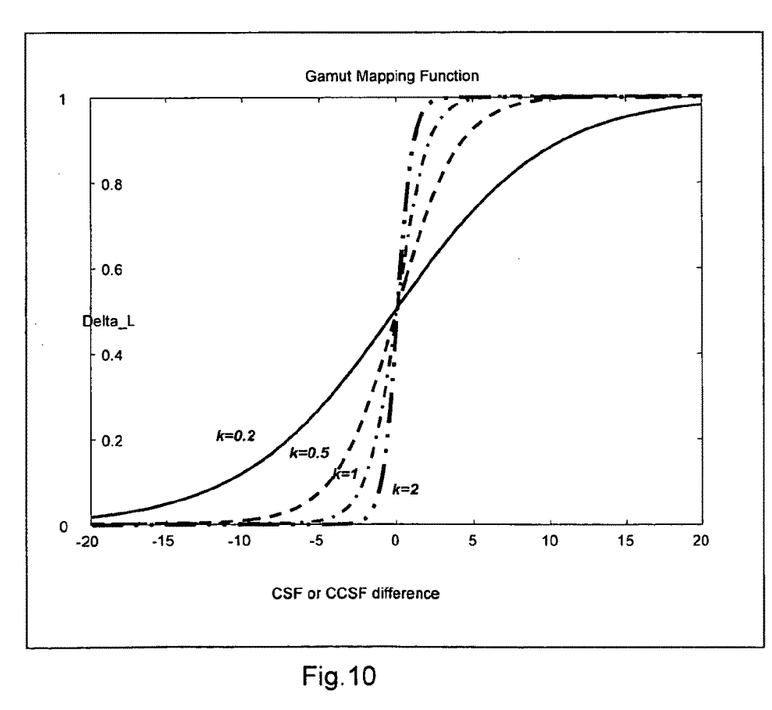
FIG. 10 represents the ΔL function of variation of the position of the anchor point for the central region of the color gamut mapping algorithm of FIG. 9.

Since, as already stated above, the limit conditions to meet are: ΔL=0 for CCSF>>CSF in the low spatial frequency range and ΔL=MIN{Lmax–$L_0$; $L_0$} for CCSF<<CSF in a higher spatial frequency range, with an intermediate situation where 0<ΔL<MIN{Lmax–$L_0$; $L_0$} in-between and a smooth transition between all cases, the following function ΔL(.) can be used to compute the range ΔL of variation of the position of the anchor point according to both the luma spatial bandwidth $F_{DCTLum\_max}$ and the chroma spatial bandwidth $F_{DCTChrom\_max}$:

$$\Delta L(x) = \frac{MIN\{Lmax - L0; L0\}}{2}\left(1 + \frac{1 - e^{-k \cdot x}}{1 + e^{-k \cdot x}}\right),$$

where x=CSF($F_{DCTLum_{max}}$)–CCSF($F_{DCTChrom_{max}}$), and where k is a smoothing positive constant. FIG. 10 illustrates such a function ΔL(.) for different values of k. Whereas high k values make this definition closer to nonlinear solutions, lower values of k, notably inferior or equal to 1, ensure a smooth transition between luminance-preserving and chrominance-preserving gamut mapping method.

Using this ΔL(.) function to define the range ΔL of variation of the position of the anchor point, a plurality of gamut mapping algorithms is now defined as clipping methods using each three regions: a central region having a variable anchor point varying in a range ΔL around a central value $L_0$, located between two regions of fixed anchor points, one of these positioned at $L_0$+ΔL, the other positioned at $L_0$–ΔL. Moreover, a selection rule is now defined that associates any spatial frequency distribution of color values within a given block area of an image to map to one color gamut mapping algorithm that has to be used to map the colors of this given block.

FIG. 9 represents typically one of the plurality of color gamut mapping clipping methods using anchor points, showing not only the three regions, not only the range ΔL of variation of the position of the anchor point for the central region, but also the different clipping trajectories that are all straight lines passing thought an anchor point located on the lightness axis, in this embodiment of the invention.

Figure 11:
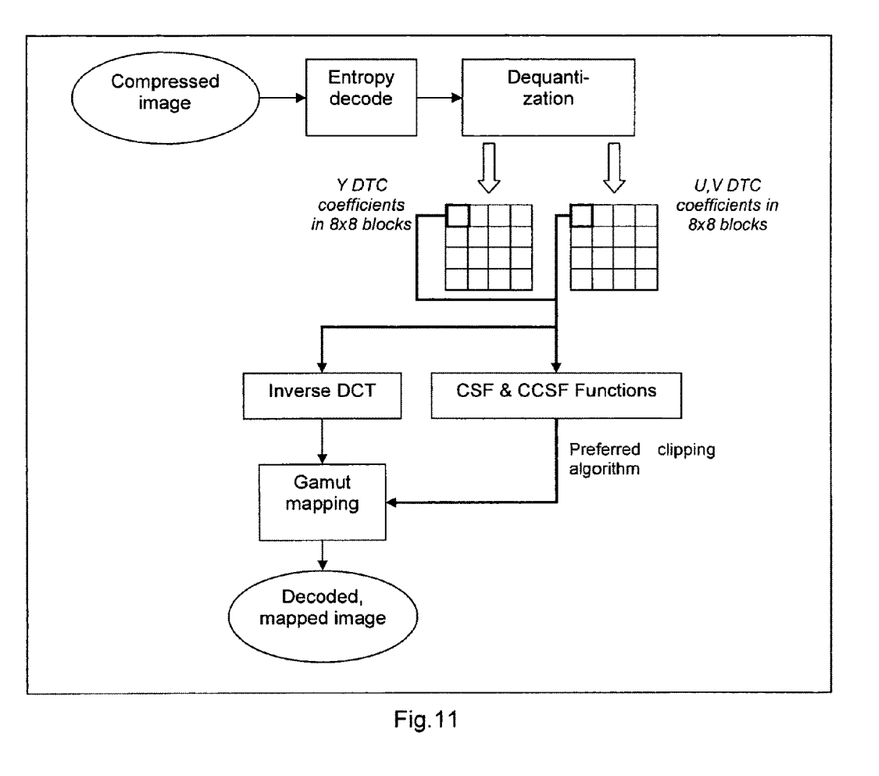
FIG. 11 illustrates the different steps of a main embodiment of a method of processing a compressed image into a decompressed color gamut mapped image according to the invention, using the plurality of color gamut mapping algorithms as exemplified on FIG. 9.

The different steps of the embodiment of a method of processing a compressed image into a gamut mapped image can now be processed as follows, in reference to FIG. 11.

In a preliminary step, the values of $L_0$ and $L_{max}$ are determined. $L_{max}$ is the maximum lightness value, which is 100 in case of CIELAB space. A reasonable value for $L_0$ is 50. $L_{max}$ and $L_0$ can be kept constant for all blocks of the images. Another possibility is to calculate $L_0$ from the mean lightness of the block of the spatial neighborhood of the block. $L_0$ should not be larger that the lightness of the display white or should not be smaller than the lightness of display black.

The first step is entropy decoding of the compressed image into a plurality of adjacent compression block areas, which is known per se and is not detailed.

The second step is dequantizing the decoded image so as to provide spatial frequency distribution of color values of pixels of this image within each block area of this image. Each block area correspond to a block in which the image has been compressed, comprising generally 8×8 pixels of the image. As the compressed image has been compressed according to DCT transform, all coefficients that are obtained are DCT coefficients. The DCT coefficients that are obtained in the x direction for a given block area represent the vertical spatial frequency distribution of colors values of this block area and the DCT coefficients that are obtained in the y direction represent the horizontal spatial frequency vertical distribution of colors of this block area. For each block area, a matrix of DCT coefficients is obtained for luma Y, and a matrix of DCT coefficients is obtained for each of the two chrominance components U, V. The YUV color space corresponds approximately to the YCbCr color space, which was developed as part of the ITU-R BT 601 standard with Y standing for the luma, Cb representing the color difference between blue and Y, and Cr denoting the color difference between red and Y. YUV traditionally represents an unscaled value being from 0-255, whereas YCbCr scales and clamps the luma to a range between 16-235 and the chroma to a range of 216-240.

At the end of this second step, for each block area of the image, three matrices are then available. Within each block area, U and V matrices are then merged into one chromatic matrix in order to provide the algorithm a scalar value for chromatic frequency distribution analysis. Based on the scalar CCSF computation previously detailed, we use once again a coarse approximation using an Euclidian distance value. Therefore, for each DCT coefficient, we compute:

$$DCT_{chroma} = \sqrt{DCT_U^2 + DCT_V^2}.$$

Figure 12:
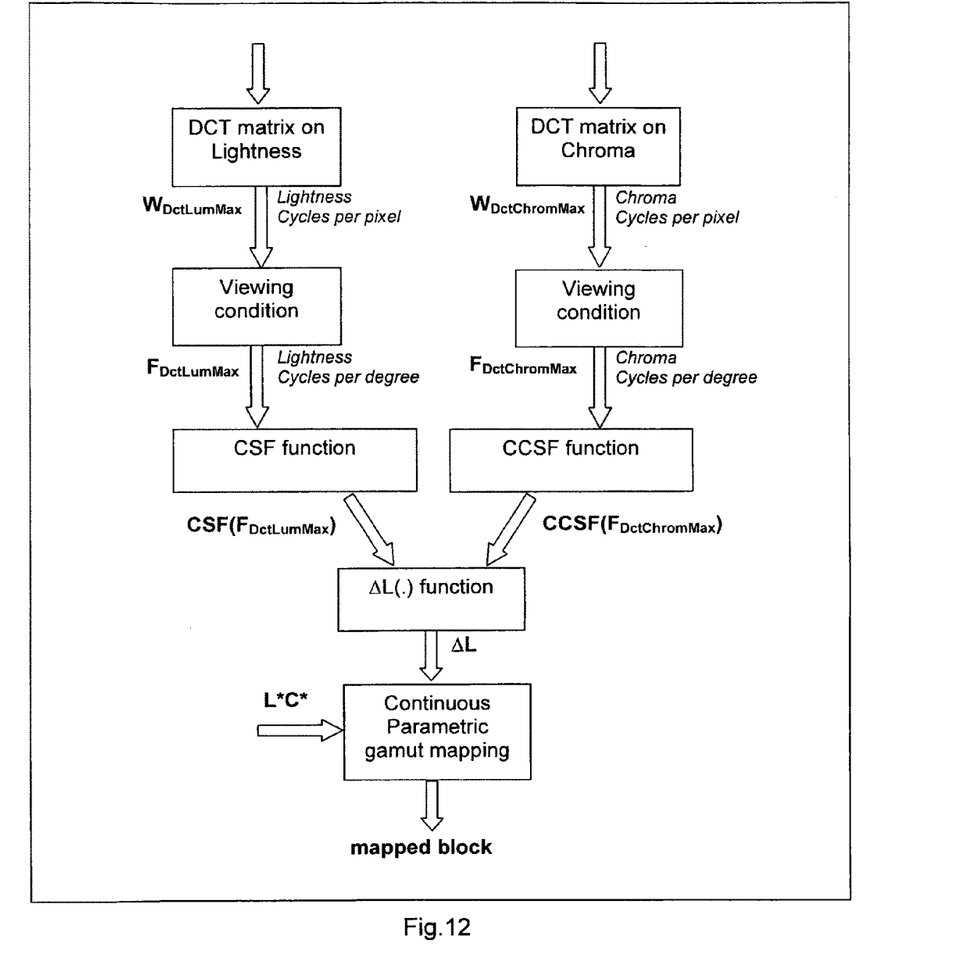
FIG. 12 represents details of FIG. 11 concerning the use of spatial frequency analysis data from the compressed image for the selection of the color gamut mapping algorithm to be used for color gamut mapping.

In reference to FIG. 12, using the specific viewing conditions under which the color gamut mapped image is intended to be displayed, and notably the distance of the viewer from the display, i.e. the angle of view α, all coefficients of the DCT luma matrix and all coefficients of the DCT chroma matrix are transformed in a manner known per se from "cycle per pixel" unit into "cycle per degree" unit. The values of the luma spatial bandwidth $W_{DCTLum\_max}$ and of the Chroma spatial bandwidth $W_{DCTChrom\_max}$ are then computed according to their previous definition (see above): the bandwidth of either luma or chroma signals is the frequency limit under which 95% of the signal's energy is contained. The values of $F_{DCTLum\_max}$ and $F_{DCTChrom\_max}$ are inferred from the values of respectively $W_{DCTLum\_max}$ and $W_{DCTChrom\_max}$ using the value of the angle of view α.

The third step is, for each block, the inverse DCT transformation of these three matrices into color values for each pixel of this block area, i.e. luma values and chrominance values. Such a step corresponds to the inverse transform of the transformation that is illustrated on FIG. 7. Such a step is known per se and is not more detailed in the present description.

The fourth step is the association of each block area with one value of ΔL allowing the definition of a specific color gamut mapping algorithm for this block area. The purpose of this fourth step is basically to compare the spatial frequency distribution (DCT coefficients) with the Contrast Sensitivity Function and with the merged Chromatic Contrast Sensitivity Function, in order to decide to favor luminance preservation or to favor chrominance preservation for the subsequent color mapping step. An additional smoothing operation may be added on the 8×8 block boundaries to avoid abrupt changes during the subsequent mapping step.

Using the algebraic formula (see above) representing the CSF and the CCSF in function of the spatial frequency F, a value of CSF(F) is calculated for $F=F_{DCTLum\_max}$ and a value of CCSF(F) is calculated for $F=F_{DCTChrom\_max}$ is calculated. Then, using the above definition of the ΔL(x) function, a value of ΔL(x) is calculated for $x=CSF(F_{DCTLum\_max})-CCSF(F_{DCTChrom\_max})$. According to this calculated value ΔL, a selection of one gamut mapping algorithm for each block area is performed. The position of the anchor point of the clipping method that is going to be used to color map the colors of each block is now clearly defined, and, to each block area of the image to color map, one of a plurality of gamut mapping algorithms is selected according to the spatial frequency distribution of color values within this block area.

The fifth step and last step is, for each block area of the image, the gamut mapping of color values that have been obtained by the third step, by using the specific clipping method selected for this block in the fourth step, having three regions as defined above, so as to provide finally the decompressed color gamut mapped image.

Advantageously, using the same DCT matrices both for decompression and for color gamut mapping allows to save significant computation resources. Globally, by providing a joint decompression and content-based gamut mapping system, computation resources can be saved, since both operations share common image analysis tools, namely luminance-chrominance conversions and space-frequency transforms.

Moreover, as image data are available into luminance-chrominance color spaces (typically YUV), such color spaces are also advantageous for color gamut mapping. As a matter of fact, in color gamut mapping, luminance-chrominance conversion is usually performed using the CIELab color space, but using the more compression-compliant color space YUV can be a reasonable approximation. Also, the local Discrete Cosine Transforms (DCT) is advantageously used to map images. This directly fits well with JPEG/MPEG data streams, since these standards also use local (8×8 blocks) DCT transforms. Other compression standards, such as JPEG2000, based on Wavelet Transforms, could also be used, since a Wavelet Transform keeps track of both spatial and spectral content in an image.

FIG. 6 shows a global diagram of the method of processing a compressed image into a decompressed color gamut mapped image according to the invention: contrary to the classical diagram shown on FIG. 5, decompression and color gamut mapping of images use the same spatial frequency analysis.

It will be understood that the present invention has been described purely by way of example, and modifications of detail can be made without departing from the scope of the invention.

When the compressed image comprises a description of an image-specific color gamut as disclosed for instance in U.S. Pat. No. 6,633,668 (see col. 4, lines 20-24), the method of processing of the invention may comprise an additional step of extraction of this description (see col. 4, line 55 up to col. 5, line 9) which is then used for the color gamut mapping step of the invention, in combination, for instance, with a description of the color gamut of a color reproduction device.

While the present invention is described with respect to preferred embodiments, it is understood that the present invention is not limited to these embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination.

The invention claimed is:

1. Method of processing a compressed image into a color gamut mapped decompressed image, comprising the steps of:
    entropy decoding the said compressed image into a plurality of adjacent compression block areas,
    dequantizing each compressed-block area so as to provide a spatial frequency distribution of color values of pixels of said image within each compression block area,
    inverse-transforming the spatial frequency distribution of each block area into color values for each pixel of said compression block area,
    for each compression block area, selecting one of a plurality of color gamut mapping algorithms according to the spatial frequency distribution of color values within said compression block area,
    gamut mapping color values of each compression block area of said image using the color gamut mapping algorithm selected for said block area, so as to provide said color gamut mapped decompressed image.

2. Method of processing according to claim 1 wherein, if the color values of each pixel are represented by at least a lightness or luma value and a chroma value, then, in said selecting step:
    a color gamut mapping algorithm minimizing the variation of chroma values is selected for all block areas in which both lightness or luma values and chroma values are distributed mainly in a low spatial frequency range below 0.4 cycle per degree,
    a color gamut mapping algorithm minimizing the variation of lightness or luma values is selected for all block areas in which both lightness or luma values and chroma values are distributed mainly in a high spatial frequency range above 0.4 cycle per degree.

3. The method of processing according to claim 2, wherein if the color values of each pixel are represented by at least a lightness or luma value and a chroma value, if, within each block area, a spatial bandwidth of the spatial frequency distribution of lightness or luma values within said block area is defined and a spatial bandwidth of the spatial frequency distribution of chroma values within said block area is defined, said selecting step is performed for said block area according to the difference between the value of the contrast sensitivity function (CSF) for said lightness or luma spatial bandwidth within said block area and the value of the chromatic contrast sensitivity function (CCSF) for said chroma spatial bandwidth within the same block area.

4. The method of processing according to claim 2, wherein each compression block area comprises 8×8 pixels.

5. The method of processing according to claim 2, wherein said compressed image is compliant with JPEG or MPEG compression standard.

6. Method of processing according to claim 1 wherein, if the color values of each pixel are represented by at least a lightness or luma value and a chroma value, if, within each block area, a spatial bandwidth of the spatial frequency distribution of lightness or luma values within said block area is defined and a spatial bandwidth of the spatial frequency distribution of chroma values within said block area is defined, said selecting step is performed for said block area according to the difference between the value of the contrast sensitivity function (CSF) for said lightness or luma spatial bandwidth within said block area and the value of the chromatic contrast sensitivity function (CCSF) for said chroma spatial bandwidth within the same block area.

7. Method of processing according to claim 1 wherein each compression block area comprises 8×8 pixels.

8. Method of processing according to claim 1 wherein said compressed image is compliant with JPEG or MPEG compression standard.

9. An apparatus of processing a compressed image into a color gamut mapped decompressed image, comprising:
    a memory; and
    a processor configured to:
        entropy decode said compressed image into a plurality of adjacent compression block areas,
        dequantize each compressed block area so as to provide a spatial frequency distribution of color values of pixels of said image within each compression block area,
        inverse-transform the spatial frequency distribution of each block area into color values for each pixel of said compression block area,
        for each compression block area, independent from other block areas, select one of a plurality of color gamut mapping algorithms according to the spatial frequency distribution of color values within said compression block area,
        gamut map color values of said image, block area by block area, the gamut mapped block areas having the same block area definition as the plurality of adjacent compression block areas from the entropy decoding, using the color gamut mapping algorithm selected for said corresponding compression block area, independent from other block areas, so as to provide said color gamut mapped decompressed image,
    wherein the spatial frequency distribution of color values that is obtained by decompressing said compressed image at the dequantizing is also used for the selecting one of a plurality of color gamut mapping algorithms, independent from other block areas, such that no other spatial frequency analysis is used for the selection.

10. The apparatus of processing according to claim 9, wherein if the color values of each pixel are represented by at least a lightness or luma value and a chroma value, then:
    a color gamut mapping algorithm minimizing the variation of chroma values is selected for all block areas in which both lightness or luma values and chroma values are distributed mainly in a low spatial frequency range below 0.4 cycle per degree, a color gamut mapping algorithm minimizing the variation of lightness or luma values is selected for all block areas in which both lightness or luma values and chroma values are distributed mainly in a high spatial frequency range above 0.4 cycle per degree.

11. The apparatus of processing according to claim 10, wherein if the color values of each pixel are represented by at least a lightness or luma value and a chroma value, if, within each block area, a spatial bandwidth of the spatial frequency distribution of lightness or luma values within said block area is defined and a spatial bandwidth of the spatial frequency distribution of chroma values within said block area is defined, the processor performs the selection for said block area according to the difference between the value of the contrast sensitivity function (CSF) for said lightness or luma spatial bandwidth within said block area and the value of the chromatic contrast sensitivity function (CCSF) for said chroma spatial bandwidth within the same block area.

12. The apparatus of processing according to claim 10, wherein each compression block area comprises 8×8 pixels.

13. The apparatus of processing according to claim 10, wherein said compressed image is compliant with JPEG or MPEG compression standard.

14. The apparatus of processing according to claim 9, wherein if the color values of each pixel are represented by at least a lightness or luma value and a chroma value, if, within each block area, a spatial bandwidth of the spatial frequency distribution of lightness or luma values within said block area is defined and a spatial bandwidth of the spatial frequency distribution of chroma values within said block area is defined, the processor performs the selection for said block area according to the difference between the value of the contrast sensitivity function (CSF) for said lightness or luma spatial bandwidth within said block area and the value of the chromatic contrast sensitivity function (CCSF) for said chroma spatial bandwidth within the same block area.

15. The apparatus of processing according to claim 9, wherein each compression block area comprises 8×8 pixels.

16. The apparatus of processing according to claim 9, wherein said compressed image is compliant with JPEG or MPEG compression standard.

\* \* \* \* \*